United States Patent
Kimura

(10) Patent No.: US 9,121,702 B2
(45) Date of Patent: Sep. 1, 2015

(54) DISTANCE MEASUREMENT APPARATUS AND DISTANCE MEASUREMENT METHOD

(75) Inventor: Masayuki Kimura, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 622 days.

(21) Appl. No.: 13/521,109

(22) PCT Filed: Nov. 7, 2011

(86) PCT No.: PCT/JP2011/006217
§ 371 (c)(1),
(2), (4) Date: Jul. 9, 2012

(87) PCT Pub. No.: WO2012/063463
PCT Pub. Date: May 18, 2012

(65) Prior Publication Data
US 2012/0281086 A1    Nov. 8, 2012

(30) Foreign Application Priority Data

Nov. 9, 2010   (JP) .................................. 2010-250436

(51) Int. Cl.
*H04N 7/18*     (2006.01)
*G01C 3/06*     (2006.01)
(Continued)

(52) U.S. Cl.
CPC . *G01C 3/06* (2013.01); *G01S 11/12* (2013.01); *H04N 5/23212* (2013.01)

(58) Field of Classification Search
CPC ...... G01B 9/02; G01B 11/022; G01B 11/024; G01H 9/00; G03F 7/70775; G01S 17/32; G01S 17/58; H04N 7/18; H04N 7/181; G01C 15/00

USPC .......................................... 348/135; 356/486
See application file for complete search history.

(56) References Cited

U.S. PATENT DOCUMENTS 4,310,227 A    1/1982   Zinchuk
5,557,407 A *  9/1996   Takamiya et al. ............. 356/499
(Continued)

FOREIGN PATENT DOCUMENTS

CN    1448928    10/2003
CN    1677136    10/2005
(Continued)

OTHER PUBLICATIONS

Office Action mailed Sep. 2, 2014 along with a search report in corresponding Chinese patent application No. 201180005647.8 with English translation of search report.
(Continued)

*Primary Examiner* — Sath V Perungavoor
*Assistant Examiner* — Howard D Brown, Jr.
(74) *Attorney, Agent, or Firm* — Wenderoth, Lind & Ponack, L.L.P.

(57) ABSTRACT

A distance measurement apparatus includes: an imaging device which captures an image; a diffractive optical device which diffracts a subject image; an optical system which forms, on the imaging device, the image from the subject image diffracted by the diffractive optical device; and a distance measurement unit which measures a distance to a subject using the image captured by the imaging device. The distance measurement unit measures the distance to the subject based on an interval between diffraction figures of the subject image which are created by the diffractive optical device. The interval is on the image captured by the imaging device.

12 Claims, 9 Drawing Sheets

(51) Int. Cl.
*G01S 11/12* (2006.01)
*H04N 5/232* (2006.01)
*G01B 9/02* (2006.01)

(56) References Cited

U.S. PATENT DOCUMENTS

| | | | |
|---|---|---|---|
| 6,490,028 | B1 | 12/2002 | Ditto et al. |
| 6,603,561 | B2 | 8/2003 | Ditto |
| 7,158,467 | B2 | 1/2007 | Sakamoto |
| 7,301,702 | B2 | 11/2007 | Nakai |
| 7,554,735 | B2 | 6/2009 | Nakai |
| 7,612,941 | B2 | 11/2009 | Nakai |
| 2002/0021448 | A1* | 2/2002 | Ishizuka et al. ............... 356/488 |
| 2002/0149762 | A1* | 10/2002 | Ditto ............................. 356/5.09 |
| 2003/0189886 | A1 | 10/2003 | Sakamoto |
| 2003/0215183 | A1* | 11/2003 | Wildnauer et al. ............. 385/37 |
| 2005/0219702 | A1 | 10/2005 | Nakai |
| 2006/0012772 | A1* | 1/2006 | Sesko ............................. 356/4.05 |
| 2007/0086083 | A1* | 4/2007 | Chiu .............................. 359/362 |
| 2007/0297057 | A1 | 12/2007 | Nakai |
| 2008/0043335 | A1 | 2/2008 | Nakai |
| 2010/0322481 | A1 | 12/2010 | Katano et al. |
| 2011/0286001 | A1* | 11/2011 | Taniguchi et al. ............ 356/445 |
| 2013/0286191 | A1* | 10/2013 | Ito et al. ........................ 348/131 |

FOREIGN PATENT DOCUMENTS

| | | |
|---|---|---|
| CN | 1844958 | 10/2006 |
| CN | 1963595 | 5/2007 |
| JP | 57-125913 | 8/1982 |
| JP | 62-222117 | 9/1987 |
| JP | 2-502398 | 8/1990 |
| JP | 2963990 | 10/1999 |
| JP | 2001-513899 | 9/2001 |
| JP | 2006-329897 | 12/2006 |
| JP | 2011-2387 | 1/2011 |
| WO | 88/05525 | 7/1988 |
| WO | 99/44013 | 9/1999 |

OTHER PUBLICATIONS

International Search Report issued Dec. 6, 2011 in International (PCT) Application No. PCT/JP2011/006217.

\* cited by examiner

DISTANCE MEASUREMENT APPARATUS AND DISTANCE MEASUREMENT METHOD

TECHNICAL FIELD

The present invention relates to a distance measurement apparatus which measures a depth of a scene based on a plurality of images captured from a single view point.

BACKGROUND ART

Various methods have been suggested for measuring, without contact, a depth of a three-dimensional scene, that is, a distance to each subject. Such methods can be classified into an active method and a passive method. In the active method, a subject is irradiated with infrared rays, ultrasonic waves, or laser beams so as to calculate the subject based on a length of time until a wave which is reflected returns or an angle of the reflected wave. In the passive method, the distance is calculated based on an image of the subject. Particularly, in the case of using a camera to measure the distance to the subject, the passive method which does not require an apparatus for emitting infrared rays and so on is widely used.

Various passive methods have been suggested, one of which is referred to as Depth from Defocus (hereinafter, referred to as DFD) which is a method to measure the distance based on a blur generated by focus change. The DFD has features such as not requiring a plurality of cameras, allowing distance measurement using a small number of images, and so on.

Hereinafter, a principle of the DFD is briefly described.

Assuming that a captured image is I(x, y), and an original image which has no blur due to a lens is S(x, y), a relationship as shown in Expression 1 can be established between I(x, y) and S(x, y).

[Math. 1]

$$I(x,y)=S(x,y)*h(x,y,d(x,y))$$ Expression 1

Here, h denotes a Point Spread Function (hereinafter, referred to as PSF) which represents a blur condition in an optical system, while d denotes the distance to the subject in the position (x, y) on the captured image or the original image. Thus, the h represents a function which depends on the aforementioned position (x, y) and the subject distance d. In addition, * in the expression represents convolution operation.

The expression 1 includes S and d as unknown quantities. Here, images $I_2$ for a single scene are captured, changing focal positions. Change in the focal position corresponds to change in the PSF with respect to a single subject distance. In other words, Expression 2 comes into effect.

[Math. 2]

$$I_2(x,y)=S(x,y)*h'(x,y,d(x,y))$$ Expression 2

Here, h' denotes a PSF in a focal position different from the focal position for h. The original image S and the subject distance d in the scene can be obtained by solving these expressions. Various solutions for the original image S and the subject distance d have been suggested in Patent Literature 1 and others.

CITATION LIST

Patent Literature

[Patent Literature 1] Japanese Patent Gazette 2963990
[Patent Literature 2] Japanese Unexamined Patent Application Publication No. 62-222117
[Patent Literature 3] Japanese Unexamined Patent Application Publication No. 2006-329897

SUMMARY OF INVENTION

Technical Problem

In view of Expression 1 and Expression 2, as the difference in the PSFs at the respective focal positions different from each other is small, a difference between the captured images I and $I_2$ becomes small, which makes it difficult to calculate the subject distance d. In other words, the difficulty in measuring the distance by the DFD is proportionate to a depth of field. Particularly, if the focal distance of a lens is short, the depth of field does not sufficiently become shallow even with an aperture of the lens being released at a maximum. This means that the DFD essentially has difficulty to be applied.

The present invention is made to solve the above problems, and an object of the present invention is to provide a distance measurement apparatus and distance measurement method with high distance-measurement accuracy even in a condition where a depth of field is large, such as a short focal distance.

Solution to Problem

A distance measurement apparatus according to an aspect of the present invention includes: an imaging device which captures an image; a diffractive optical device which diffracts a subject image; an optical system which forms, on the imaging device, the image from the subject image diffracted by the diffractive optical device; and a distance measurement unit which measures a distance to a subject using the image captured by the imaging device, in which the distance measurement unit measures the distance to the subject based on an interval between diffraction figures of the subject image which are created by the diffractive optical device, and the interval is on the image captured by said imaging device.

With this configuration, the distance to the subject is calculated based on the interval between the diffraction figures which are created by the diffraction in addition to a size of a blur. The interval between the diffraction figures are not affected by a depth of field. The shorter the distance to the subject is, the narrower the interval becomes, i.e., the longer the distance to the subject is, the wider the interval becomes. Accordingly, even if the depth of field is large and the blur does not occur, the distance to the subject can accurately be calculated using images captured from a single view point.

The aforementioned distance measurement apparatus may further include an optical filter which transmits each of light beams in a corresponding one of specified wavelength bands.

The effects due to the diffraction vary according to wavelengths. If no optical filter is used, a light beam from a single point receives various effects due to the diffraction. Accordingly, the light beam is not focused on a single point, causing the image to be blurred. This requires processing of removing the blur. According to the configuration of the present invention, since only a specified wavelength is used to obtain an image having no blur, no processing of removing the blur is required. This simplifies processing of calculating the distance to the subject.

The diffractive optical device may have a curved surface. The curved surface is preferably a spherical surface, and a curvature radius of the curved surface is approximately equal to a distance between the aperture of the optical system and the diffractive optical device on the optical axis.

With this configuration, even if a field angle varies, positions of the diffraction figures are not biased by positive and negative of an order of the diffraction. This removes the necessity to consider the field angle when the distance to the subject is calculated, thereby simplifying the processing.

The curved surface may be an aspheric surface.

With this configuration, even if the field angle varies, the positions of the diffraction figures are not biased by the positive and negative of the order of the diffraction, and the interval between the diffraction figures can also be kept constant with respect to the field angle. This simplifies the processing of calculating the distance to the subject.

The aforementioned distance measurement apparatus may further include a lighting device which emits a light beam in a specified wavelength band to the subject.

The light beam in the specified wavelength band is emitted to the subject, causing the image in the specified wavelength band to be captured, in the same manner with the case where the optical filter is used. Accordingly, an image having no blur can be obtained, and the processing of calculating the distance to the subject can be simplified.

Note that the present invention can be achieved not only as a distance measurement apparatus including such distinguishable processing units but also as a distance measurement method including, as steps, processing implemented by the distinguishable processing units included in the distance measurement apparatus. The present invention can also be achieved as a program which causes a computer to be operated as the distinguishable processing units included in the distance measurement apparatus, or a program which causes a computer to execute the distinguishable steps included in the distance measurement method Furthermore, it is needless to say that such a program can be distributed via a non-transitory computer readable recording medium including Compact Disc-Read Only Memory (CD-ROM) and so on or a communication network such as the Internet.

Solution to Problem

Advantageous Effects of Invention

In a distance measurement apparatus and distance measurement method according to the present invention, a distance to a subject is calculated based on an interval between diffraction figures generated not by a size of a blur but by diffraction. Accordingly, the distance to the subject can be accurately obtained from images captured at a single view point even in a condition where a depth of field is large and the blur does not occur.

DESCRIPTION OF EMBODIMENTS

Hereinafter, embodiments of the present invention are described in detail with reference to the drawings. It should be noted that the embodiments described below each represent preferred embodiments of the present invention. A numeral value, a shape, a material, a component, an arrangement position and connection condition of the components, a step, and a flow of steps, and the like described in the embodiments are merely examples, and are not intended to limit the present invention. The scope of the present invention is limited only by the scope of the claims. Accordingly, the component which is not defined in an independent claim representing the broadest concept of the present invention is described as not being necessarily required for achieving the object of the present invention but constituting a more preferred embodiment.

Embodiment 1

Figure 1:
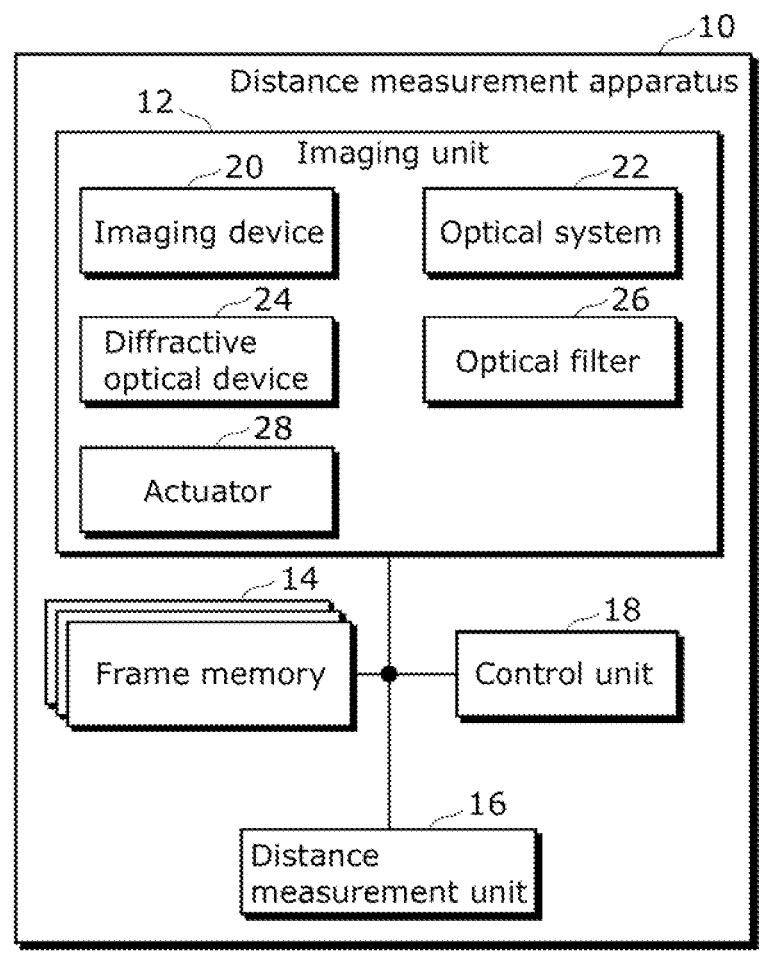
FIG. 1 is a block diagram showing a functional construction of a distance measurement apparatus according to Embodiment 1 of the present invention.

Hereinafter, an embodiment of the present invention is described with reference to the drawings. FIG. 1 is a block diagram showing a construction of a distance measurement apparatus in view of its function according to Embodiment 1 of the present invention.

A distance measurement apparatus 10 includes an imaging unit 12, a frame memory 14, a distance measurement unit 16, and a control unit 18.

The imaging unit 12 includes an imaging device 20, a diffractive optical device 24, an optical system 22, an optical filter 26, and an actuator 28. The imaging unit 12 captures a subject image and provides an image.

The imaging device 20 captures an image, and includes a Charge Coupled Device (CCD), a Complementary Metal Oxide Semiconductor (CMOS), or the like.

The diffractive optical device 24 causes the subject image to be diffracted. A preferable material of the diffractive optical device 24 includes, but not particularly limited to, a transparent glass or the like which transmits light. Transmission of light enables to prevent light quantity from decreasing. For example, as preferable constructions, the diffractive optical device 24 is constructed such that parallel grooves are formed in a glass to form a convexo-concave surface or transparent materials having refractive indexes different from each other are alternately arranged. Meanwhile, the diffractive optical device 24 can also be prepared by alternately arranging a portion which blocks light and a portion which transmits light. In this case, however, the light quantity decreases.

The optical system 22 forms, in the imaging device 20, an image of the subject image diffracted by the diffractive optical device 24.

The optical filter 26 transmits a light beam having a specified wavelength band.

The actuator 28 allows the diffractive optical device 24 to advance or retreat with respect to an optical path of the optical system 22.

The diffractive optical device 24 is movable back and forth with respect to the optical path by the actuator 28, so as to switchingly capture images between a image in which diffraction does not occur and an image in which the diffraction occurs. The diffractive optical device 24 is located in a position which is on an optical axis of the optical system 22 and is closer to a subject than an aperture of the optical system 22 is.

The frame memory 14 is a memory for storing the image on a basis of frame, and stores the image provided from the imaging unit 12, and so on.

The distance measurement unit 16 calculates a subject distance based on the image captured by the imaging unit 12. Specifically, the distance measurement unit 16 measures the distance to the subject based on intervals of diffraction figures of the subject image on the image captured by the imaging device 20. The diffraction figures are created by the diffractive optical device 24.

The control unit 18 includes a central processing unit (CPU), as well as a read only memory (ROM), a random access memory (RAM) and others for storing a control program, so as to control functional blocks.

Hereinafter, a principle of calculating the subject distance based on the intervals of the diffraction figures is described.

Figure 2:
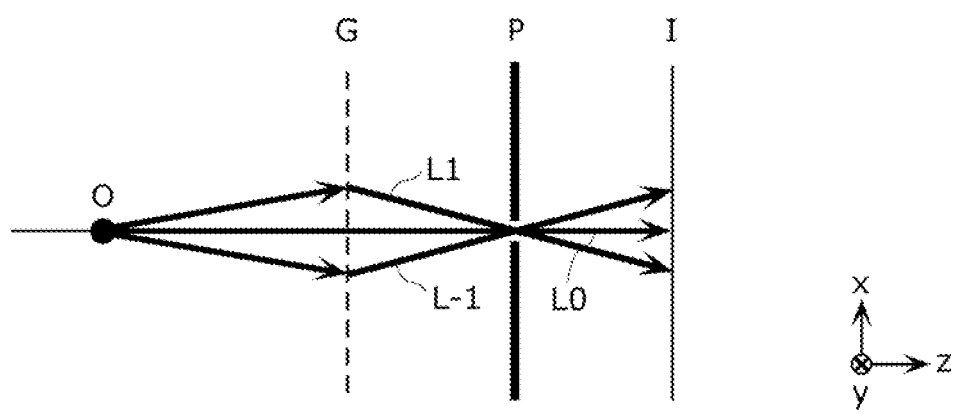
FIG. 2 is a diagram schematically showing incidence of a light beam via the diffractive optical device.

FIG. 2 is a diagram schematically showing that a light beam is incident via the diffractive optical device. In FIG. 2, a diffractive optical device G corresponds to the diffractive optical device 24, while an imaging surface I corresponds to the imaging device 20. In FIG. 2, the diffractive optical device G is located between a subject o and a pinhole P. The light beam emitted from the subject o enters the diffractive optical device G, and is inflected at a diffraction angle in response to a property of the diffractive optical device G. Among the inflected light beams, only a light beam which has a specified inflection angle can pass the pinhole P, and reach the imaging surface I. The diffraction angle is defined in accordance with an order of the diffraction. Accordingly, a plurality of light beams including a zero-order light beam (L0) which is not a diffracted light beam, a positive first-order diffracted light beam (L1), a negative first-order diffracted light beam (L-1), and so on reach the imaging surface I. Although a diffracted light beam of second order or higher can reach the imaging surface I, those are not shown in FIG. 2 for simplification. It should be noted that a position of the pinhole P corresponds to a position of the aperture of the optical system 22.

Figure 3:
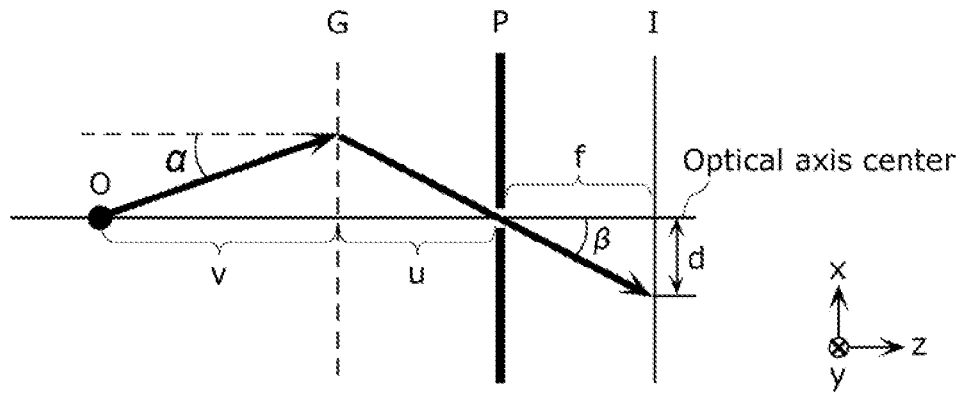
FIG. 3 is a diagram showing a geometric relationship on the incidence of the light beam via the diffractive optical device.

FIG. 3 is a diagram showing a geometric aspect in a case when a light beam is incident via the diffractive optical device 24(G). In view of FIG. 3, a distance d between a position where the diffraction figure is created on the imaging surface I and the center of the optical axis is represented by Expression 3 shown below.

[Math. 3]

$$d = f \tan \beta \qquad \text{Expression 3}$$

Here, f denotes a distance from the pinhole to the imaging surface, i.e., a focal distance. According to FIG. 3, an angle β is equal to an angle of emergence of the light beam from the diffractive optical device G. Accordingly, if an incident angle of the light beam from the subject o to the diffraction optical element G is set to α, Expression 4 shown below is satisfied based on the formula of diffraction.

[Math. 4]

$$\sin\alpha + \sin\beta = \frac{n\lambda}{D} \qquad \text{Expression 4}$$

Here, n, λ, and D respectively represents the order of the diffraction, a wavelength of the incident light, and a lattice spacing of the diffractive optical device G. In addition to the above, Expression 5 shown below can be established between a distance v which is defined from the subject o to the diffractive optical device G on the optical axis and a distance u which is defined from the diffractive optical device G to the pinhole P on the optical axis.

[Math. 5]

$$v \tan \alpha = u \tan \beta \qquad \text{Expression 5}$$

The angle β associated with the order n of the diffraction is calculated from Expressions 4 and 5, and the distance d can be calculated from Expression 3 based on the obtained angle β. Furthermore, the angle β is determined in accordance with the distance v to the subject, in view of Expression 5. Accordingly, a position d (which is determined by the distance d from the center of the optical axis on the imaging surface I and at which the diffraction figure is created) also changes in accordance with the subject distance.

It should be noted that Patent Literature 1 discloses a method for measuring a distance to a subject using the diffractive optical device, similar to the present invention. In addition, Patent Literature 2 discloses a method for calculating a distance to a subject based on intervals of light points of light beams when the light beams reach the subject, the light beams being dispersed by the diffraction which is generated by irradiating a transmissive diffractive optical device with a laser beam. According to the method, the subject distance is calculated using the principle of triangulation.

Figure 4:
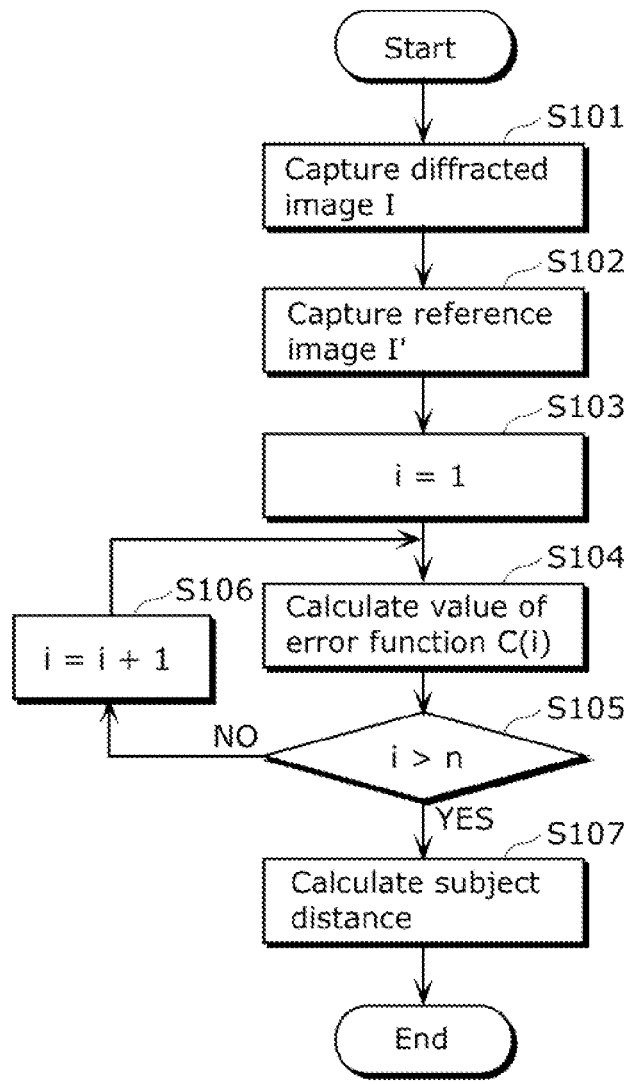
FIG. 4 is a flow chart showing an example of a flow of processing of calculating a subject distance.

Next, a flow of processing of calculating the subject distance is described. FIG. 4 is a flow chart showing an example of the flow of processing in which the distance measurement apparatus 10 calculates the subject distance. According to this processing, the most appropriate subject distance is calculated from predetermined n stages of subject distances V(1), V(2), . . . , and V(n).

Figure 5:
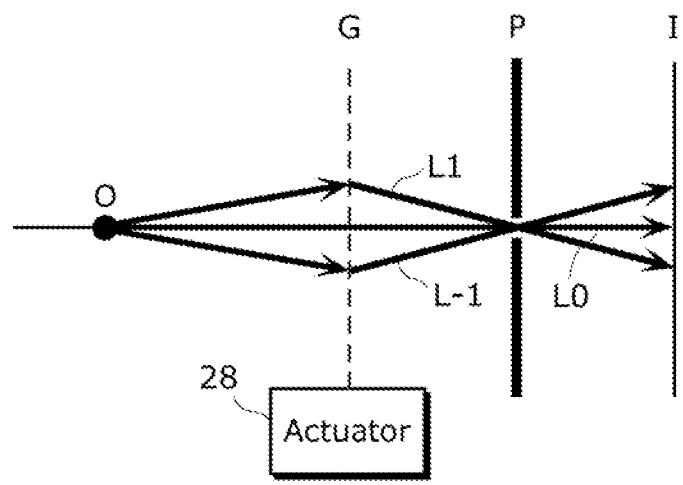
FIG. 5 is a diagram for illustrating movement of the diffractive optical device by an actuator in order to capture a diffracted image.
Figure 6:
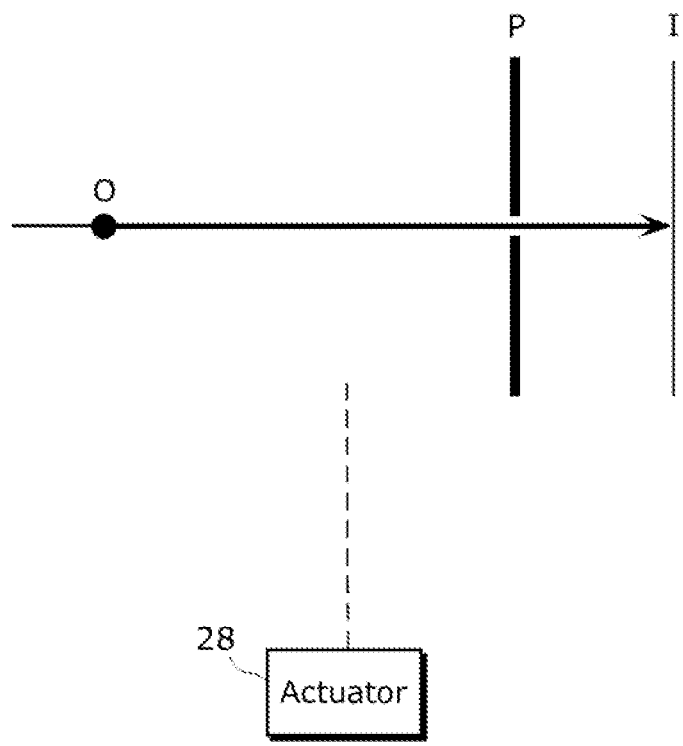
FIG. 6 is a diagram for illustrating movement of the diffractive optical device by the actuator in order to capture a reference image.

The imaging device 20 captures a diffracted image I and a reference image I' (Steps S101 and S102). Here, the diffracted image represents an image obtained in a condition that the diffractive optical device 24 is placed on the optical path, while the reference image represents an image obtained in a condition that the diffractive optical device 24 is not placed on the optical path. When the diffracted image I is captured, the actuator 28 causes the diffractive optical device 24 to advance on the optical path, as shown in FIG. 5. On the other hand, when the reference image I' is captured, the actuator 28 causes the diffractive optical device 24 to retreat from the optical path, as shown in FIG. 6. It should be noted that the Steps S101 and S102 may be in the reverse order.

Here, a relationship shown in Expression 6 below is satisfied between the diffracted image I and the reference image I'.

[Math. 6]

$$I(x,y)=I'(x,y)*h(x,y,d(x,y)) \qquad \text{Expression 6}$$

Figure 7A:
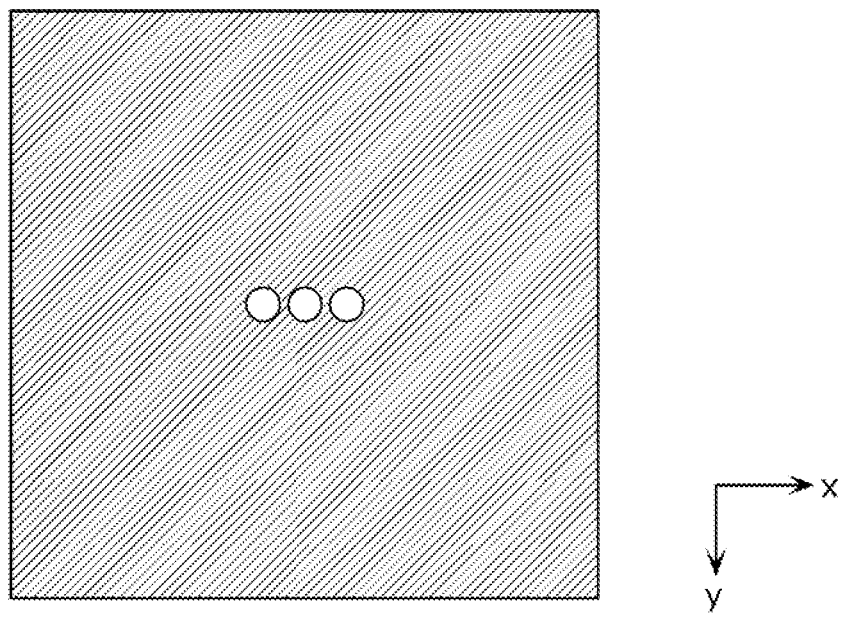
FIG. 7A is a diagram schematically showing a PSF shape (kernel shape) in the case of a short subject distance.
Figure 7B:
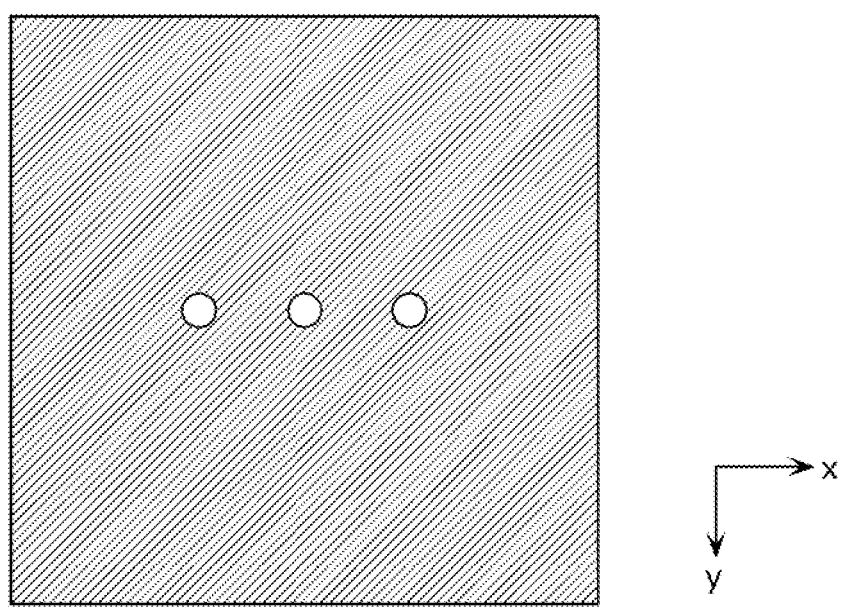
FIG. 7B is a diagram schematically showing a PSF shape (kernel shape) in the case of a long subject distance.

It is noted that * represents a convolution operation. Here, h denotes a kernel schematically shown in FIG. 7A or FIG. 7B. Based on the relationship represented by Expression 3 or 5, if a subject distance V(i) (i=1 to n) is short, each of intervals between diffracted light beams is narrow as shown in FIG. 7A. On the other hand, if the subject distance v(i) is long, each of the intervals between diffracted light beams is broad as shown in FIG. 7B. FIGS. 7A and 7B each show examples of the kernel when three light beams are considered, as the diffracted light beams, including the zero-order light beam, the positive first-order light beam, and the negative first-order light beam. In practice, however, the number of points (diffracted light beam) and the intervals may change in accordance with the order of the diffracted light beams which reach the imaging surface. Furthermore, FIGS. 7A and 7B each show examples using, as the optical system, an optical system in which a degree of the blur undergoes little change according to the distance. The kernel can be calculated by simulation, and corresponds to the ideal diffracted image I obtained when a point light source is assumed to exist at a position of the subject, for example.

The control unit 18 substitutes an initial value 1 into a counter i (Step S103). The distance measurement unit 16 calculates a value of an error function C(x, y, i) with respect to the subject distance V(i) at the stage I, for every pixel (x, y) of an image (the diffracted image I or the reference image I') (Step S104). The error function C(x, y, i) can be represented by Expression 7 shown below.

[Math. 7]

$$C(x,y)=|I(x,y)*I'(x,y)*h(x,y,i)| \qquad \text{Expression 7}$$

The value of the error function C(x, y, i) corresponds to a difference between an actual diffracted image I(x, y) and a value resulting from the convolution operation on the reference image I'(x, y) which is not subjected to the diffraction with the kernel h(x, y, i) corresponding to the distance V(i) at the stage i. The difference is minimum when the object o actually exist at the distance V(i) in the stage i.

The error function C(x, y, i) expresses an absolute value of the difference between pixels in Expression 7. The error function C(x, y, i) can be defined based on an arbitrary form which expresses a distance, such as L2 norm.

The control unit 18 calculates the value of the error function C(x, y, i), and then determines whether or not a value of the counter i reaches n (Step S105). If the value of the counter i does not reach n (NO in Step S105), the control unit 18 increments the value of the counter i by 1 (Step S106). The distance measurement unit 16 repeats processing of calculating the value of the error function C(x, y, i) (Step S104) until the value of the counter i reaches n.

The distance measurement unit 16 calculates all values of the error function C(x, y, i) in the stage n (YES, in Step S105), and subsequently, calculates the subject distance (Step S107). The subject distance v(x, y) at the position (x, y) can be represented by Expression 8 shown below.

[Math. 8]

$$v(x, y) = V\left(\operatorname*{argmin}_{i} C(x, y, i)\right) \qquad \text{Expression 8}$$

Here, Expression 9 represents a value of i when a value of a function f(i) becomes minimum.

[Math. 9]

$$\operatorname*{argmin}_{i} f(i) \qquad \text{Expression 9}$$

According to Expression 8, specifically, the distance V(i) associated with the stage i where the value of the error function C(x, y, i) is minimum is calculated as the subject distance at each position (x, y).

It should be noted that the subject distance V(i) is defined in accordance with Expressions 3 to 5. Such a method is used that, for example, the distance V(i) at the stage i is set to a value of v when a position d(i) of the diffraction figure corresponds to a value represented by an expression of d(i)=ia (a: arbitrary constant). A value of a constant a is preferably determined as a size such that the diffracted image in the position d(i) of each stage i is distinguishable on the captured image (for example, a level of a pixel size of the imaging device). As a matter of course, the subject distance V(i) may be determined in accordance with relationships other than the above. Expressions 3 to 5 are determined without considering effects of refraction or the like due to a thickness or a material of the diffractive optical device 24. Accordingly, the position d(i) of the diffraction figure, which takes into account these effects, may be calculated by an optical simulation to determine the corresponding subject distance V(i), for example.

Expression 6 is expressed by the same form with those of Expressions 1 and 2. Accordingly, the blurs in the diffraction figure and DFD can be expressed in a same frame. Therefore, processing of DFD may be applied to calculate the subject distance in the recognition of the kernel indicated in FIG. 7A or 7B as the PSF. In this case, an existing DFD processing algorithm is used to calculate the subject distance.

Instead of using the same frame with those for DFD as in the aforementioned example, each of the intervals of the diffraction figures may directly be calculated by autocorrelation or the like from the diffraction figure I, so as to calculate the subject distance using Expressions 3 to 5. Patent Literature 3 discloses a method, for example, for calculating an interval of double images shown on a transparent plate by searching a position in which the autocorrelation takes the local maximal value along displacement constraint between the double images. Such a method may be used to calculate the subject distance.

According to Embodiment 1 of the present invention, the subject distance can be calculated based on the interval between the diffraction figures, while the conventional DFD calculates the subject distance based on variation in the size of the blur. Considering a variation amount in the blur size when the subject distance varies in a certain amount, the variation amount is approximately proportional to a size of the aperture of the optical system. Accordingly, the variation amount becomes small as the focal distance decreases. In contrast, when the wavelength λ of an incident light beam is constant, the interval d between the diffraction figures is determined based on the distance u between the diffractive optical device G and the pinhole P, a lattice spacing D, and the order n of the diffraction, but not based on a focal distance f (the distance from the pinhole to the imaging surface) and the size of the aperture. Accordingly, even if the focal distance is short, the variation amount of the interval d between the diffraction figures can be increased. As a result, measurement accuracy of the subject distance can be enhanced.

Embodiment 2

A distance measurement apparatus according to Embodiment 2 of the present invention can keep intervals between diffraction figures equal to each other with respect to a diffraction direction. Specifically, the diffractive optical device 24 has a curved-surface shape. Other components are the same with those in Embodiment 1. The reason for the construction is described below.

Figure 8:
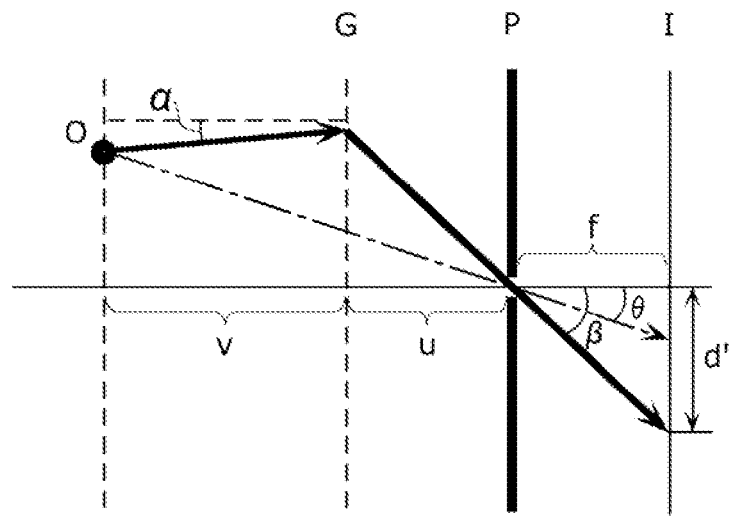
FIG. 8 is a diagram schematically showing the incidence of the light beam from a point off an optical axis through the diffractive optical device.
Figure 8:
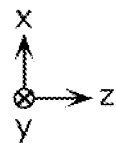

In FIGS. 2 and 3, the case where the subject o is on an optical axis is considered. On the other hand, in FIG. 8, the case where the subject o is on a position defined by a field angle θ is considered. Similar to the cases respectively shown in FIGS. 2 and 3, a light beam entering the diffractive optical device G(24) at a specified angle among light beams emitted from the subject o is inflected by the diffraction, subsequently passes through the pinhole P, and then enters the imaging surface I. At this time, a distance d' between a position where the diffraction figure is formed on the imaging surface I and the center of the optical axis is represented by Expression 10 shown below.

[Math. 10]

$$d' = f \tan \beta \quad \text{Expression 10}$$

In addition, Expression 11 shown below is satisfied in the incident angle β of a diffracted light beam, the field angle θ, an incident angle α of the light beam from the subject o to the diffractive optical device G.

[Math. 11]

$$(u+v)\tan \theta + v \tan \alpha = u \tan \beta \quad \text{Expression 11}$$

A value d' can be calculated from Expressions 10 and 11, and Expression 4 which is the formula of the diffraction.

Assuming that positions of a positive first-order light beam, a zero-order light beam, and a negative first-order light beam are respectively d'(+1), d'(0), and d'(−1), Expressions 4 and 11 show that a distance from d'(0) to d'(+1) and a distance from d'(0) to d'(−1) are different from each other if the field angle θ is not 0. The above is shown by raising actual numeral values by means of an optical simulation. For the optical simulation, the optical simulation software "ZEMAX (product name)" of Development Corporation is used hereinafter.

A configuration of an optical system is shown in Table 1. R, d, nd, vd respectively represent, in this order, a curvature radius (unit: mm) of each surface, a surface interval (unit: mm), a refractive index of d line, and an Abbe number. Here, the surface number 0 indicates a position of the object.

TABLE 1

| Surface no. | Surface type | R | d | nd | vd |
|---|---|---|---|---|---|
| 0 | | ∞ | 1.0e5 | | |
| 1 | diffraction | ∞ | 2.0 | 1.517 | 64.17 |
| 2 | | ∞ | 48.0 | | |
| 3 (aperture) | paraxial | ∞ | 5.0 | — | — |
| 4 (image surface) | | ∞ | — | | |

In Table 1, a surface having a surface type of "diffraction" indicates a diffraction surface, while a surface having the surface type of "paraxial" indicates an ideal lens with no aberration. A surface having a blank for the surface type indicates a spherical surface.

Here, a lattice spacing of the diffraction surface is set to 2 μm, a focal distance of the ideal lens is set to 5 nm, and a wavelength of the light beam is set to 550 nm. Under this condition, each value of d'(+1), d'(0), and d'(−1) is calculated for the respective cases when the field angle θ is 0 degree, 10 degrees, and 20 degrees. The obtained values are shown in Table 2. Every unit for d' is mm. In addition, xey indicates x×10$^y$.

TABLE 2

| Field angle θ | d'(+1) | d'(0) | d'(−1) | d'(+1) − d'(0) | d'(0) − d'(−1) |
|---|---|---|---|---|---|
| 0° | 1.422 | 0 | −1.422 | 1.422 | 1.422 |
| 10° | 2.499 | 0.882 | −0.503 | 1.617 | 1.385 |
| 20° | 3.903 | 1.820 | 0.342 | 2.083 | 1.478 |

Figure 9A:
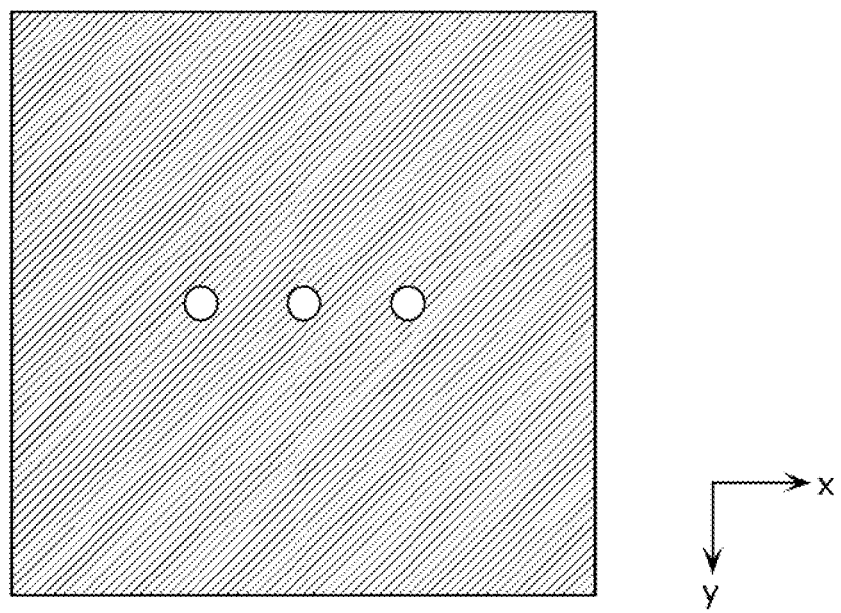
FIG. 9A is a diagram schematically showing the PSF shape (kernel shape) in the case of the short subject distance.
Figure 9B:
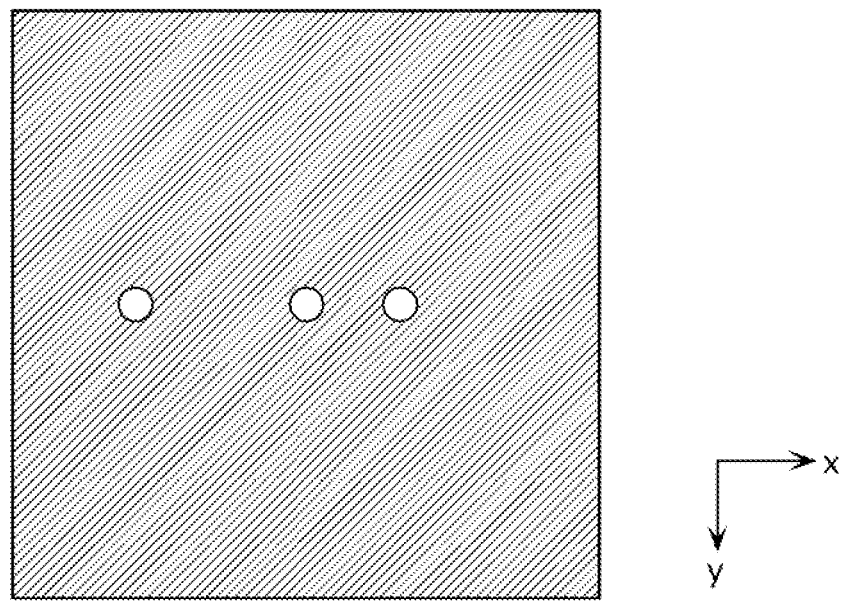
FIG. 9B is a diagram schematically showing the PSF shape (kernel shape) off the optical axis.

If the field angle is 0 degree, the positive first-order light beam and the negative first-order light beam are located in respective positions each equally distant away from the zero-order light beam, as schematically shown in FIG. 9A. However, as the field angle increases, the intervals of the diffracted light beams suffer from non-uniformity, as shown in FIG. 9B. Accordingly, in the calculation of the subject distance, the kernel need to be prepared for every position (x, y) in images even in the same ith distance, as the kernel h(x, y, i) which is the subject to the convolution operation when the value of the error function C(x, y, i) is calculated in Expression 7. For simplification of processing, the kernel is preferably uniform in the entire image.

Figure 10:
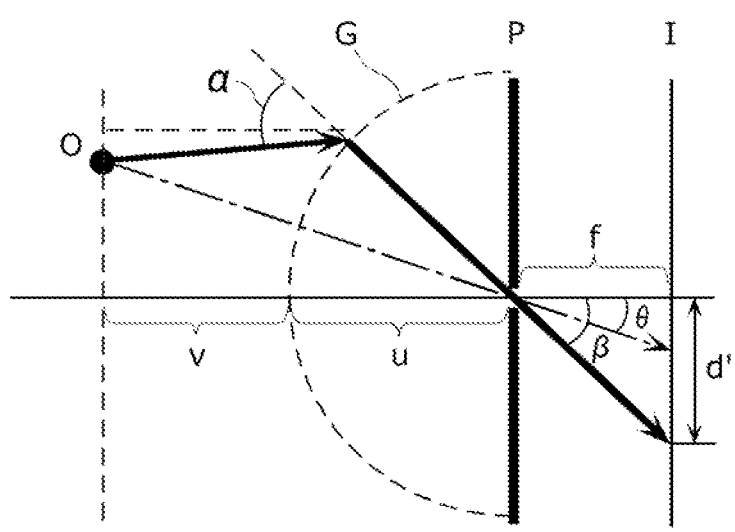
FIG. 10 is a diagram schematically showing the incidence of the light beam from a point off the optical axis via the diffractive optical device formed in a spherical surface.

Such nuniformity is attributed to the fact that the diffractive optical device is formed in a plane, and an incident angle of the light beam entering the diffractive optical device varies depending on the field angle. As shown in FIG. 10, the diffractive optical device G is formed in a curved-surface shape, and its curvature radius is defined to be approximately equal to a distance from a diffraction surface to an aperture on the optical axis. With this configuration, the light beam traveling to the center of the pinhole P is always incident to the diffractive optical device G approximately perpendicularly. Therefore, the incident angle can be kept approximately constant. A position of the diffraction figure at the time when the diffraction surface is in the curved-surface shape, is calculated as follows.

In view of FIG. 10, a relationship shown in Expression 12 below is satisfied among angles α, β, and θ.

[Math. 12]

$$u \sin \beta = (v + u(1/(1 - \cos \beta))\tan(\alpha - \beta) + (u+v)\tan \theta \quad \text{Expression 12}$$

Furthermore, the curvature radius of the diffraction surface is equal to the distance from the diffraction surface to the aperture, so that an angle of emergence after the diffraction becomes orthogonal to the diffraction surface. Therefore, Expression 13 is satisfied from the formula of diffraction.

[Math. 13]

$$\sin\alpha = \frac{n\lambda}{D}\cos\beta \qquad \text{Expression 13}$$

Here, n, λ, and D respectively denotes an order of the diffraction, a wavelength of the incident light beam, and a lattice spacing of the diffractive optical device G. Deletion of α from Expressions 12 and 13 allows an angle β associated with the field angle θ to be calculated, thereby obtaining a position d of the diffraction figure from Expression 3.

An effect obtained by forming the diffractive optical device G in the curved-surface shape is described with reference to the optical system 22 shown in Table 3. Here, parameters of the lattice spacing and the focal distance of the ideal lens are the same with those in the examples shown in Table 1. In addition, the curvature radius of each of a first surface and a second surface is equal to the distance from the diffraction surface to the aperture. Each value of d'(+1), d'(0), and d'(−1) is calculated for the respective cases when the field angle θ is 0 degree, 10 degrees, and 20 degrees. The obtained values are shown in Table 4 below.

TABLE 3

| Surface no. | Surface type | R | d | nd | vd |
| --- | --- | --- | --- | --- | --- |
| 0 | | ∞ | 1.0e5 | | |
| 1 | diffraction | 50.0 | 2.0 | 1.517 | 64.17 |
| 2 | | 50.0 | 48.0 | | |
| 3 (aperture) | paraxial | ∞ | 5.0 | — | — |
| 4 (image surface) | | ∞ | — | | |

TABLE 4

| Field angle θ | d'(+1) | d'(0) | d'(−1) | d'(+1) − d'(0) | d'(0) − d'(−1) |
| --- | --- | --- | --- | --- | --- |
| 0° | 1.397 | 0 | −1.397 | 1.397 | 1.397 |
| 10° | 2.319 | 0.900 | −0.519 | 1.419 | 1.419 |
| 20° | 3.350 | 1.860 | 0.371 | 1.490 | 1.489 |

In view of Table 4, in every field angle, values of d'(+1)−d'(0) and values of d'(0)−d'(−1) are approximately equal to each other. This means that bias due to the field angle is solved.

A flow of processing of calculating the subject distance when the diffraction surface is the curved-surface shape is approximately same with those described in Embodiment 1. The difference from Embodiment 1 is that the subject distance is calculated in accordance with Expression 14 shown below instead of Expression 8, from the subject distance V(x, y, 1), V(x, y, 2), ..., and V(x, y, n) at the stage n previously determined for each of pixels in the image.

[Math. 14]

$$v(x, y) = V\left(x, y, \left(\underset{i}{\mathrm{argmin}}\, C(x, y, i)\right)\right) \qquad \text{Expression 14}$$

In Expression 8, V uses a single sequence in the overall image, while in Expression 14, a used sequence varies according to each of pixels.

If the diffraction surface is shaped in a plane, each of the intervals between the diffraction figures varies depending on the field angle in addition to the positive and negative of the order of the diffraction. However, according to Embodiment 2 of the present invention, the diffraction surface is formed in the curved-surface shape, allowing a light beam to enter the diffraction surface perpendicularly. This solves the non-uniformity occurring in the intervals between the diffraction figures. Therefore, the subject distance calculation processing can be simplified.

[Modification]

In the modification, the diffractive optical device 24 has an aspheric curved-surface shape. Use of the aspheric-surface shape makes it possible to control, in detail, a position where a light beam reaches, thereby keeping intervals between diffraction figures to be equal to each other with respect to positive and negative of an order of diffraction, and allowing the interval to be constant with respect to a field angle. A specific shape of the aspheric surface is determined by performing optimization by an optical simulation in such a manner that, in an arbitrary field angle and wavelength, the intervals of the diffraction figures are equal to each other with respect to the positive and negative of the order of the diffraction, and are constant with respect to the field angle.

An example of such an optical system is shown in Table 5. A lattice spacing of a diffraction surface, a focal distance of an ideal lens, and a wavelength of the light beam are respectively set to 2 μm, 5 mm, and 550 nm. In optimization, the field angle θ is estimated with respect to three points, i.e., 0 degree, 10 degrees, and 20 degrees.

TABLE 5

| Surface no. | Surface type | R | d | nd | vd |
| --- | --- | --- | --- | --- | --- |
| 0 | | ∞ | 01.0e5 | | |
| 1 | diffraction | ∞ | 2.0 | 1.517 | 64.17 |
| 2 | aspherical | 72.272 | 48.0 | | |
| 3 (aperture) | paraxial | ∞ | 5.0 | — | — |
| 4 (image surface) | | ∞ | — | — | — |

A surface having a surface type of "aspherical" represents an aspheric surface. The aspheric-surface shape is represented by Expression 15 shown below.

[Math. 15]

$$Z = \frac{cr^2}{1+\sqrt{1-(1+k)c^2 r^2}} + A_4 r^4 + A_6 r^6 + A_8 r^8 + A_{10} r^{10} + A_{12} r^{12} \qquad \text{Expression 15}$$

Here, c=1/R is satisfied, k denotes a constant of the cone, and A4, A6, A8, A10, and A12 respectively denote fourth, sixth, eighth, tenth, and twelfth aspheric coefficients. The constant of the cone and the aspheric coefficient with respect to the second surface in Table 5 are shown in Table 6. Meanwhile, r denotes a curvature of the aspheric shape, while z denotes a distance in the optical axis direction from an aperture to the aspheric-surface shape.

TABLE 6

| k | A4 | A6 | A8 | A10 | A12 |
|---|---|---|---|---|---|
| 0 | −8.0525e−6 | 1.07732e−7 | −4.67435e−10 | 9.22735e−13 | −6.71705e−16 |

Table 7 shows respective values of d'(+1), d'(0), and d'(−1) respectively obtained when the field angle θ is set to 0 degree, 10 degrees, and 20 degrees in the optical system indicated in Tables 5 and 6.

TABLE 7

| Field angle θ | d'(+1) | d'(0) | d'(−1) | d'(+1) − d'(0) | d'(0) − d'(−1) |
|---|---|---|---|---|---|
| 0° | 1.033 | 0 | −1.033 | 1.033 | 1.033 |
| 10° | 1.690 | 0.656 | −0.376 | 1.034 | 1.032 |
| 20° | 2.316 | 1.284 | 0.254 | 1.032 | 1.030 |

Table 8 shows a position of the diffraction figure when the subject distance is set to 1,000 mm in the same optical system.

TABLE 8

| Field angle θ | d'(+1) | d'(0) | d'(−1) | d'(+1) − d'(0) | d'(0) − d'(−1) |
|---|---|---|---|---|---|
| 0° | 1.000 | 0 | −1.000 | 1.000 | 1.000 |
| 10° | 1.656 | 0.656 | −0.344 | 1.000 | 1.000 |
| 20° | 2.288 | 1.286 | 0.283 | 1.002 | 1.003 |

In every subject distance, the intervals between the diffraction figures are almost equal to each other with respect to the positive and negative of the order of the diffraction, and keep almost constant with respect to the field angles.

Although the embodiments of the present invention are described in the above, the present invention is not limited to the above, but applicable to various embodiments for achieving at an object of the present invention and other objects associated therewith. The present invention may also include the following.

For example, a pinhole is used as the optical system for calculating the position of the diffracted image in Embodiments 1 and 2. However, an optical imaging system may be used which includes a single lens or a lens group consisting of a plurality of lenses. In this case, the positions of the diffraction figures are different from those in the case when the pinhole is used, due to a refraction effect of the lens. However, the positions of the diffraction figures are also changed depending on the subject distance. Accordingly, the subject distance can be calculated in the same manner with the case when the pinhole is used. In other words, the subject distance can be calculated in the same manner with the case when the pinhole is used, by assuming that the position of the aperture of the optical system corresponds to the position of the pinhole.

For example, in Embodiments 1 and 2, the optical filter 26 may have a feature of allowing light beams in a plurality of wavelength bands to pass therethrough, and the subject distance may be calculated from images in the wavelength bands which were allowed to pass through the optical filter.

Figure 11:
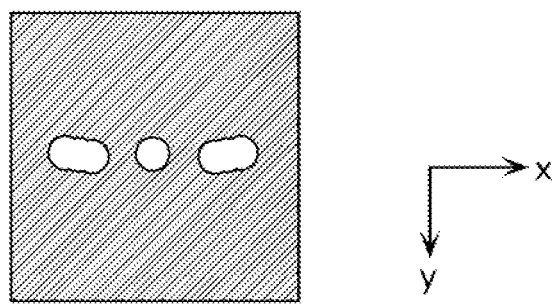
FIG. 11 is a diagram showing an example of a diffracted image obtained by capturing a white-point light source without using an optical filter.
Figure 12A:
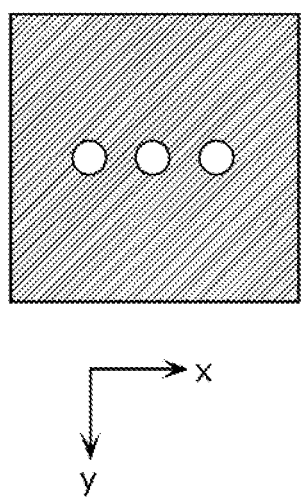
FIG. 12A is a diagram showing an example of the diffracted image obtained by capturing the white-point light source using an optical filter in a blue wavelength band.
Figure 12B:
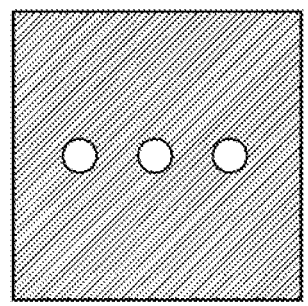
FIG. 12B is a diagram showing an example of the diffracted image obtained by capturing the white-point light source using an optical filter in a green wavelength band.
Figure 12B:
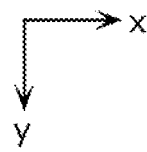
Figure 12C:
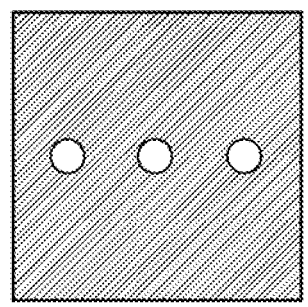
FIG. 12C is a diagram showing an example of the diffracted image obtained by capturing the white-point light source using an optical filter in a red wavelength band.
Figure 12C:
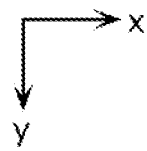

FIG. 11 is a diagram showing an example of a diffracted image obtained by capturing a white-point light source without using the aforementioned optical filter 26. Expression 4 shows that the angle of emergence of the diffracted light beam varies depending on the wavelength band. For this reason, the diffraction figures are blurred in FIG. 11. FIGS. 12A to 12C show the diffracted images in which the white-point light source which is the same with that used in FIG. 11 is captured in each of wavelength bands, using the aforementioned optical filter 26. FIGS. 12A, 12B, and 12C respectively show the diffracted images in a blue wavelength band, a green wavelength band, and a red wavelength band. No blur occurs in the diffraction figures in the respective wavelength bands. The distance-measurement results obtained from the respective diffracted images are combined, so that an error in the subject-distance calculation due to noise in the image is reduced, thereby enabling to measure the distance with higher accuracy. For example, an average of a plurality of distances at a single pixel position, which is measured using a plurality of diffracted images, may be the subject distance.

As the optical filter 26, a color filter may be used which is arranged in a front surface of the optical system. The color filter is used, so as to transmit a light beam in a specified wavelength. For example, three color filters which respectively transmit light beams in the red, blue, and green wavelength bands are switchingly used to measure distances using the light beams in the respective three wavelength bands. With this method, three distances are obtained for a single subject. Accordingly, a single distance may be calculated by an operation from the three distances. For example, an average value of the three distances may be the subject distance.

A lighting device which emits a light beam having a specified wavelength band may be used instead of the color filter. Such a lighting device may emit an illumination light beam in a specified wavelength band to a subject, so that the diffracted image in a specified wavelength band may be captured. In order to capture the diffraction images in a plurality of wavelength bands, the diffraction image may be captured by emitting the illumination light beam to the subject with the wavelength being switched.

[Modifications]

Although the present invention is described in accordance with the aforementioned embodiments, it is needless to say that the present invention is not limited to the above embodiments. The present invention also includes following cases.

(1) A part or all of components constituting the aforementioned respective devices may be formed, specifically, as a computer system including a microprocessor, a ROM, a RAM, a hard disc unit, a display unit, a keyboard, a mouse, and the like. The RAM or the hard disc unit stores a computer program. The microprocessor operates in accordance with the computer program, so that each of the devices accomplishes its function. Here, the computer program is, for accomplishing a predetermined function, configured by combining a plurality of instruction codes indicating instructions for a computer.

(2) A part or all of the components constituting each of the above devices may be configured by a single System-LSI (Large-Scale Integration) circuit. The System-LSI is a super multifunction LSI manufactured by integrating a plurality of constituent units on a single chip, and is, specifically, a computer system including a microprocessor, a ROM, a RAM, and so on. The RAM stores a computer program. The microprocessor operates in accordance with the computer program, so that the System-LSI accomplishes its function.

(3) A part or all of the components constituting each of the devices may be configured as an IC card which is detachable from each of the devices or a single module. The IC card or the module is a computer system including a microprocessor, a ROM, a RAM, and so on. The IC card or the module may include the super multifunction LSI. The microprocessor operates in accordance with the computer program, so that the IC card or the module accomplishes its function. The IC card or the module may have tamper resistance.

(4) The present invention may be in the form of the method described above. In addition, the present invention may be a computer program which realizes the method by a computer, or may be a digital signal including the computer program.

The present invention may also be realized by storing the computer program or the digital signal in a computer readable recording medium, such as a flexible disc, a hard disc, a CD-ROM, an MO, a DVD, a DVD-ROM, a DVD-RAM, a Blue-ray disc (registered mark), or a semiconductor memory. Alternatively, the present invention may also include the digital signal recorded in these recording media.

The present invention may also be realized by transmission of the aforementioned computer program or digital signal via an electric telecommunication line, a wireless or wired communication line, a network represented by the Internet, a data broadcast, and so on.

The present invention may also be a computer system including a microprocessor and a memory, in which the memory stores the aforementioned computer program, and the microprocessor operates in accordance with the computer program.

Furthermore, the program or the digital signal may be stored in the recording medium so as to be transferred, or the program or the digital signal may be transferred via the network or the like so as to be executed by another independent computer system.

(5) The above embodiments and modifications may be combined arbitrarily.

Figure 13:
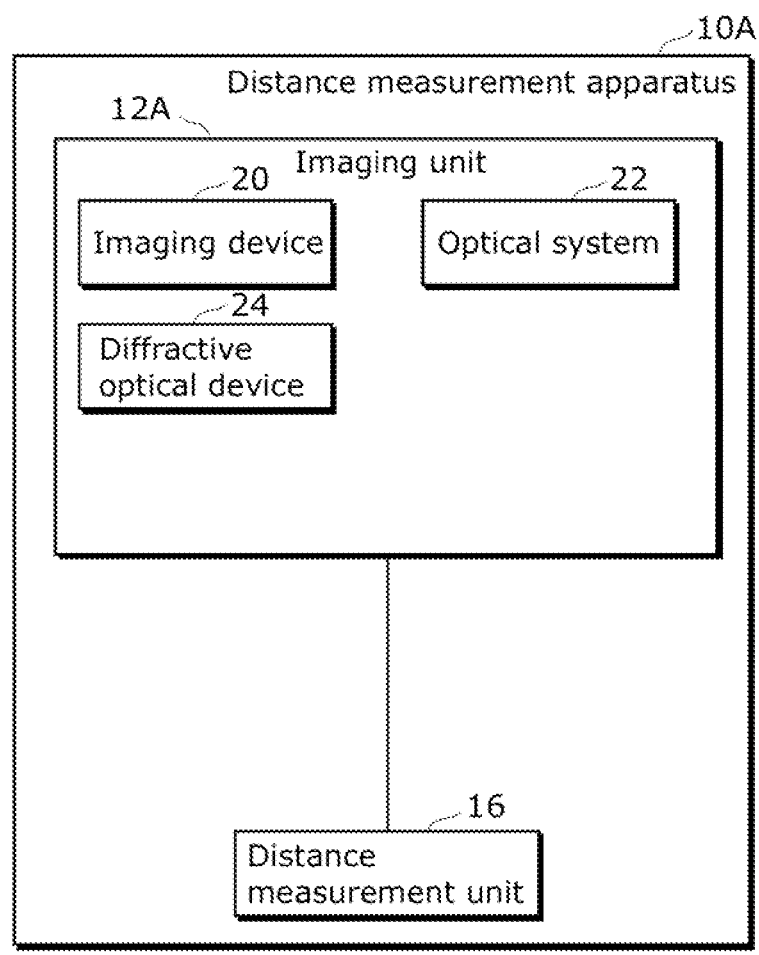
FIG. 13 is a block diagram showing a functional construction of the distance measurement apparatus including components necessary for the present invention.

FIG. 13 is a block diagram showing a distance measurement apparatus including components necessary to the present invention. A distance measurement apparatus 10A includes an imaging unit 12A and the distance measurement unit 16. The imaging unit 12A includes the imaging device 20, the optical system 22, and the diffractive optical device 24. In other words, though the aforementioned optical filter 26, actuator 28, frame memory 14, and control unit 18 are not the necessary components, it is preferable that the distance measurement apparatus includes these components.

The embodiments described above should be considered as illustrative but not restrictive in every respect. The scope of the present invention is indicated not by the above description but by the scope of the claims, and equivalents to those in the claims and all possible modifications in the claims are intended to be included in the scope of the present invention.

INDUSTRIAL APPLICABILITY

A distance measurement apparatus according to the present invention can measure a distance based on an image captured from a single view point. Accordingly, the distance measurement apparatus is applicable to general imaging equipment. Particularly, the distance measurement apparatus is optimal to imaging equipment using a compact imaging device requiring a focal distance to be short in view of principle of distance measurement using a position of a diffraction figure instead of blur.

REFERENCE SIGNS LIST

10 Distance measurement apparatus
12 Imaging unit
14 Frame memory
16 Distance measurement unit
18 Control unit
20 Imaging device
22 Optical system
24 Diffractive optical device
26 Optical filter
28 Actuator

The invention claimed is:

1. A distance measurement apparatus comprising:
an imaging device which captures an image;
a diffractive optical device which has a curved surface and diffracts a subject image;
an optical system which forms, on said imaging device, the image from the subject image diffracted by said diffractive optical device; and
a distance measurement unit configured to measure a distance to a subject using the image captured by said imaging device,
wherein said distance measurement unit is configured to measure the distance to the subject based on an interval between diffraction figures of the subject image which are created by said diffractive optical device, the interval being on the image captured by said imaging device.

2. The distance measurement apparatus according to claim 1,
wherein said diffractive optical device is placed at a position which is on an optical axis of said optical system, and closer to the subject than an aperture of said optical system.

3. The distance measurement apparatus according to claim 1,
wherein said diffractive optical device is movable back and forth with respect to an optical path in said optical system: and
said distance measurement unit is configured to measure the distance to the subject, using (i) a reference image captured by said imaging device in a state where said diffractive optical device is off the optical path and (ii) a diffracted image captured by said imaging device in a state where said diffractive optical device is on the optical path.

4. The distance measurement apparatus according to claim 3,
wherein said distance measurement unit is configured to determine, as the distance to the subject, a candidate having a minimum difference between the diffracted image and an image resulting from a convolution operation performed on a kernel into the reference image, the kernel being previously defined for each of the candidates for the distance to the subject.

5. The distance measurement apparatus according to claim 1, further comprising
an optical filter which transmits each of light beams in a corresponding one of specified wavelength bands.

6. The distance measurement apparatus according to claim 5,
wherein said optical filter has a feature of transmitting the light beams in a plurality of wavelength bands: and
said distance measurement unit is configured to measure the distance to the subject, using a plurality of images corresponding to the respective wavelength bands.

7. The distance measurement apparatus according to claim 2,
wherein the curved surface is a spherical surface, and a curvature radius of the curved surface is approximately equal to a distance between the aperture of said optical system and said diffractive optical device on the optical axis.

8. The distance measurement apparatus according to claim 1,
wherein the curved surface is an aspheric surface.

9. The distance measurement apparatus according to claim 1, further comprising
a lighting device which emits a light beam in a specified wavelength band to the subject.

10. A distance measurement method performed using a distance measurement apparatus which includes:
an imaging device which captures an image;
a diffractive optical device which has a curved surface and diffracts a subject image; and
an optical system which forms, on said imaging device, the image from the subject image diffracted by said diffractive optical device,
said distance measurement method comprising
measuring a distance to a subject based on an interval between diffraction figures of the subject image which are created by said diffractive optical device, the interval being on the image captured by said imaging device.

11. A non-transitory computer-readable recording medium which holds a program for causing a computer to execute said distance measurement method according to claim 10.

12. An integrated circuit which measures a distance using a distance measurement apparatus which includes:
an imaging device which captures an image;
a diffractive optical device which has a curved surface and diffracts a subject image;
an optical system which forms, on said imaging device, the image from the subject image diffracted by said diffractive optical device,
said integrated circuit comprising
a distance measurement unit configured to measure a distance to a subject based on an interval between diffraction figures of the subject image which are created by said diffractive optical device, the interval being on the image captured by said imaging device.

* * * * *